United States Patent

Gillard et al.

[11] Patent Number: 5,944,300
[45] Date of Patent: Aug. 31, 1999

[54] BAG AND BOX VALVE SYSTEM

[75] Inventors: David Frederick Gillard, Woodstock, Ga.; Anthony John Madormo, Valencia; Dennis Leroy Hart, Newport Beach, both of Calif.

[73] Assignees: MacMillan Bloedel Packaging, Marietta, Ga.; Magic Plastics Inc., Valencia, Calif.

[21] Appl. No.: 09/090,995

[22] Filed: Jun. 5, 1998

[51] Int. Cl.$^6$ .................................................. F16K 3/10
[52] U.S. Cl. ............................................. 251/187; 251/300
[58] Field of Search ................................. 251/158, 187, 251/300

[56] References Cited

U.S. PATENT DOCUMENTS

| | | |
|---|---|---|
| 88,008 | 3/1869 | Chase et al. . |
| 521,832 | 6/1894 | Stone . |
| 634,730 | 10/1899 | Howe et al. . |
| 3,321,175 | 5/1967 | Epp . |
| 4,219,183 | 8/1980 | Hoffmann et al. .................. 251/187 X |
| 4,603,835 | 8/1986 | de Mey, II .......................... 251/187 X |

Primary Examiner—John Fox
Attorney, Agent, or Firm—Shlesinger, Arkwright & Garvey LLP

[57] ABSTRACT

A valve system for a bag and box combination employs a fitment having an inner mounting flange secured to the inner surface of a bag and with a projecting portion projecting out through a hole in the bag and into a passageway in the outer container. A valve plate is positioned within the bag and mounted to rotate with a shaft between an open position wherein the valve plate does not obstruct the flow passage through the fitment and is axial space from its cooperating seat form by the inner surface of the mounting flange and a closed position where the valve plate is pressed towards and cooperates with the inner face of the mounting flange in surrounding relationship to the flow passage to seal the flow passage.

6 Claims, 6 Drawing Sheets

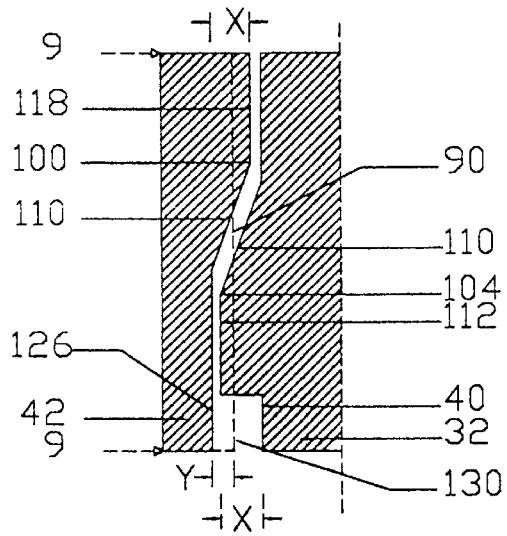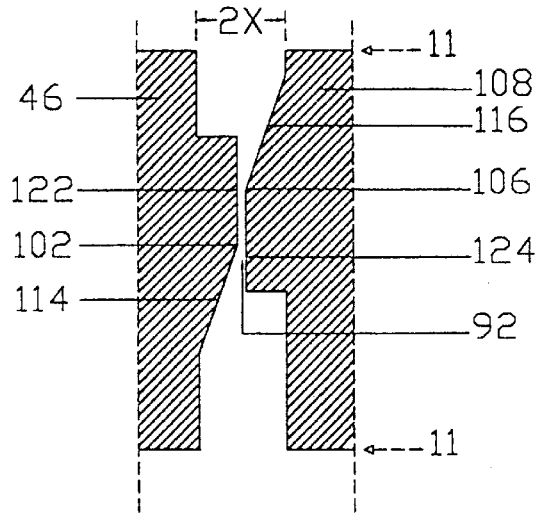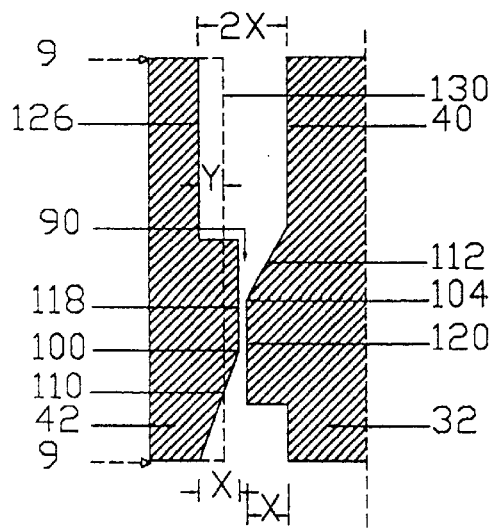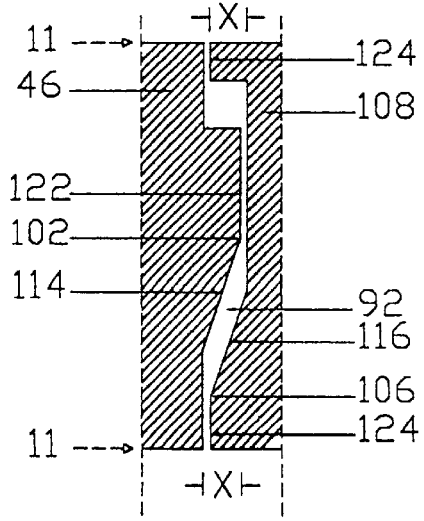

BAG AND BOX VALVE SYSTEM

FIELD OF INVENTION

The present invention relates to a bag and box combination, more particularly, the present invention relates to a bag and box combination with an improved valve system.

BACKGROUND OF THE INVENTION

The use of a bag and box combination generally employs some form of dispensing fitment fixed to a bag and that projects through an opening in the sidewall of the outer rigid container. During shipment, the passage through the fitment is sealed, for example, by means of a membrane or by welding the bag to the inside of the mounting flange of the fitment, i.e. on the side of the fitment mounting flange remote from the outside container so that the bag actually covers the passage through the fitment. In most cases, both the fitment membrane and bag and a cap or plug or the like at the exposed end of the fitment are used to seal the fitment during shipment.

While these sealing devices seal the bag and box combination during shipment, it is obviously necessary to open the passage through the fitment for dispensing of materials from the bag. This opening operation generally employs an external valve that is secured to the fitment in place of the cap or plug and is fitted with some means for puncturing the bag portion or membrane that seals the fitment passage.

Obviously, these systems are cumbersome and require that the control valve be attached at the point where the material is to be dispensed from the bag. This valve must remain in place until the bag has been emptied which makes relocating of the bag and box more difficult. Alternatively the valve may be attached and the unit shipped with the bag and valve in place, but this requires an oversized pallet thereby increasing the cost and increases the risk of in transit leakage.

A review of the literature indicates that gate valves for use in rigid containers have been known for many, many years, see for example, U.S. Pat. No. 88,008 issued Mar. 23, 1869 by Chase et al., U.S. Pat. No. 521,832 issued Jun. 26, 1894, U.S. Pat. No. 634,730 issued Oct. 10, 1899 to Howe et al. or more recently, U.S. Pat. No. 3,321,175 issued May 23, 1967 to App.

The Chase et al. patent describes a plate or gate valve that is moved between the open and close position by pivoting on an axis formed by a rigid shaft which is rotated to adjust the position of the plate. This is common to all of the above patents. Also, all of the above patents relate to application of such valve to rigid structures (as opposed to flexible bags) so that a valve plate may easily be moved from open to close position without interference with the structure to which it is connected).

The Chase et al. patent provides a system wherein the valve plate is contained within a rigid block and the movement of the valve plate is confined by the block to the width in the block structure. This requires that the block structure be sufficiently large to contain the valve plate throughout its movement and in both its open and closed positions and thus renders the device relatively bulky and ineffective for many purposes.

BRIEF DESCRIPTION OF THE PRESENT INVENTION

It is an object of the present invention to provide a new valve structure particularly suited for bag and box combinations.

It is an object of the present invention to provide a bag and box combination with a valve built into the fitment.

Broadly, the present invention relates to a valved fitment comprising a body portion having an axial passage formed therethrough, an annular radial flange on said body portion surrounding an inner end of said passage, a valve plate, a shaft pivotably mounting said valve plate on said body portion for movement with said shaft about a longitudinal axis of said shaft, said longitudinal axis of said shaft being parallel to a longitudinal axis of said axial passage at said inner end of said axial passage and being spaced to one side of said axial passage, said valve plate sealing said axial passage when said valve plate is turned by said shaft into a closed position and to open said passage when said shaft is turned on its said longitudinal axis to an open position, a dual acting cam for moving said valve plate parallel to said longitudinal axis of said shaft, said dual acting cam including a first cam means connected to said valve plate and a cooperating cam means fixed to said body portion, said first cam means and said cooperating cam means acting to move said valve plate toward said surface when said valve means is turned by said shaft toward said closed position and to move said valve plate away from said surface when said valve plate is moved toward said open position.

Broadly, the present invention relates to a bag and box combination comprising an outer stiff walled container and an inner flexible bag liner contained within and supported by walls of said stiff walled container when said flexible bag liner is filled, a fitment fixed to said bag liner, a hole through a wall of said stiff walled container defining a passageway through which a projecting portion of said fitment is received, said fitment including a body portion having an axial passage formed therethrough and through said projecting portion, an annular radial mounting flange on said body portion surrounding an inner end of said passage, said annular flange being connected to said bag liner to seal said fitment to said bag liner around said axial passage, said projecting portion projecting into said passageway, a valve plate, a shaft pivotably mounting said valve plate on said body portion for movement with said shaft about a longitudinal axis of said shaft, said longitudinal axis of said shaft means being parallel to a longitudinal axis of said axial passage at said inner end of said axial passage and being spaced to one side of said axial passage, said valve plate sealing said axial passage when said valve plate is turned by said shaft into a closed position and to open said passage when said shaft is turned on its said longitudinal axis to an open position.

Preferably, said fitment includes a dual acting cam for moving said valve plate parallel to said longitudinal axis of said shaft, said dual acting cam including a first cam means connected to said valve plate and a cooperating cam means fixed to said body portion, said first and said cooperating cam means acting to move said valve plate toward said surface when said valve means is turned by said shaft means toward said closed position and to move said valve plate away from said surface when said valve plate is moved toward said open position.

Preferably, said first cam means comprises a first pair of cam elements coaxial with said shaft means, one cam element of said first pair of cam elements positioned adjacent to an inner end of said shaft and adjacent to one axial end of said body portion and a second cam element of said first pair of cam elements axially spaced from said inner end of said shaft and on side of said body portion opposite said surface and said cooperating cam means comprises a pair of cooperating cam elements each positioned to cooperate with its adjacent of said first pair of cam elements to positively move said valve plate axially relative to said longitudinal axis of said shaft means.

Preferably each cam element of said first pair of cam elements and each cooperating cam element of said pair of cooperating cam elements includes a raised cam portion and a sloping cam portion leading to said raised cam portion, said raised portions on said one cam element and its cooperating cam element being in opposing relationship when said valve plate is in open position and said raised portions on a second cam element and its cooperating cam element being in offset relationship when said valve plate is in said open position.

Preferably, said annular flange is connected to bag liner by connecting an outer surface of said annular flange to an inside surface of said bag liner Preferably, an O-ring gasket is mounted on said valve plate, said O-ring having a diameter larger than the diameter of said axial passage and surrounding said axial passage when said valve plate is in said closed position.

Preferably, a guide is provided on said mounting flange in a position to engage the outer periphery of said valve plate at a side of said axial passage remote from said shaft, said guide guiding said valve plate into said closed position.

Preferably, said body portion further includes a stop projecting from said cooperating surface into said bag liner adjacent to said shaft, said stop being positioned to stop said valve plate from movement in a direction away from said closed position.

BRIEF DESCRIPTION OF THE DRAWINGS

Further features, objects and advantages will be evident from the following detailed description of the preferred embodiments of the present invention taken in conjunction with the accompanying drawings in which;

FIG. 9 is an exploded cross sectional view taken across the cams on the line 9—9 of FIGS. 5 and 6 of the first pair of cooperating cam elements one on the seal plate and the other on the body portion flange showing the valve in closed position.

FIG. 10 is an exploded cross sectional view on line 9—9 of the first pair of cooperating cam elements one on the seal plate and the other on the body portion flange similar to FIG. 9 but showing the valve in open position.

FIG. 11 is an exploded cross sectional view taken across the cams on the line 11—11 of FIGS. 7 and 8 showing the second pair of cooperating cam elements one at an outer axial end of a cylindrical portion of the body and the other fixed to the seal plate via the operating shaft showing the valve in closed position.

FIG. 12 is an exploded cross sectional view on line 11—11 of the second pair of cooperating cam elements one at an outer axial end of a cylindrical portion of the body and the other fixed to the seal plate via the operating shaft similar to FIG. 11 but showing the valve in open position.

DESCRIPTION OF THE PREFERRED EMBODIMENTS

Figure 1:
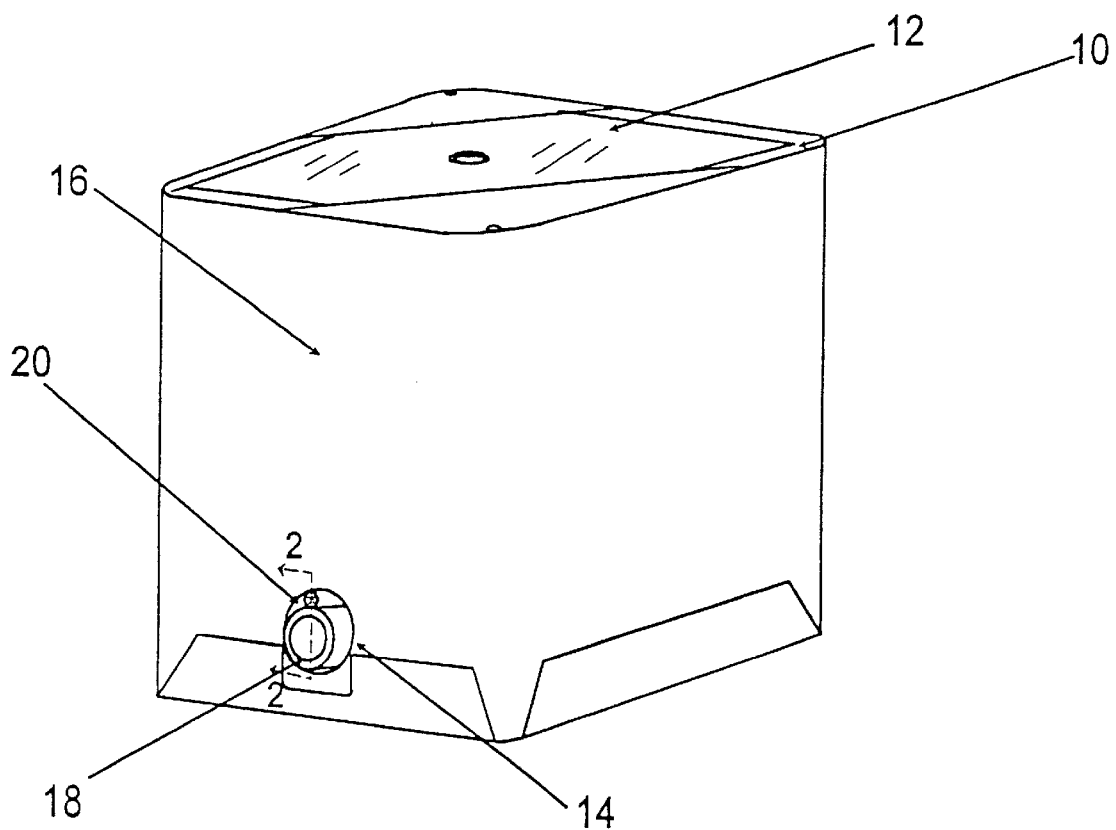
FIG. 1 is a schematic isometric illustration of a bag and box containing the valve fitment of the present invention.
Figure 3:
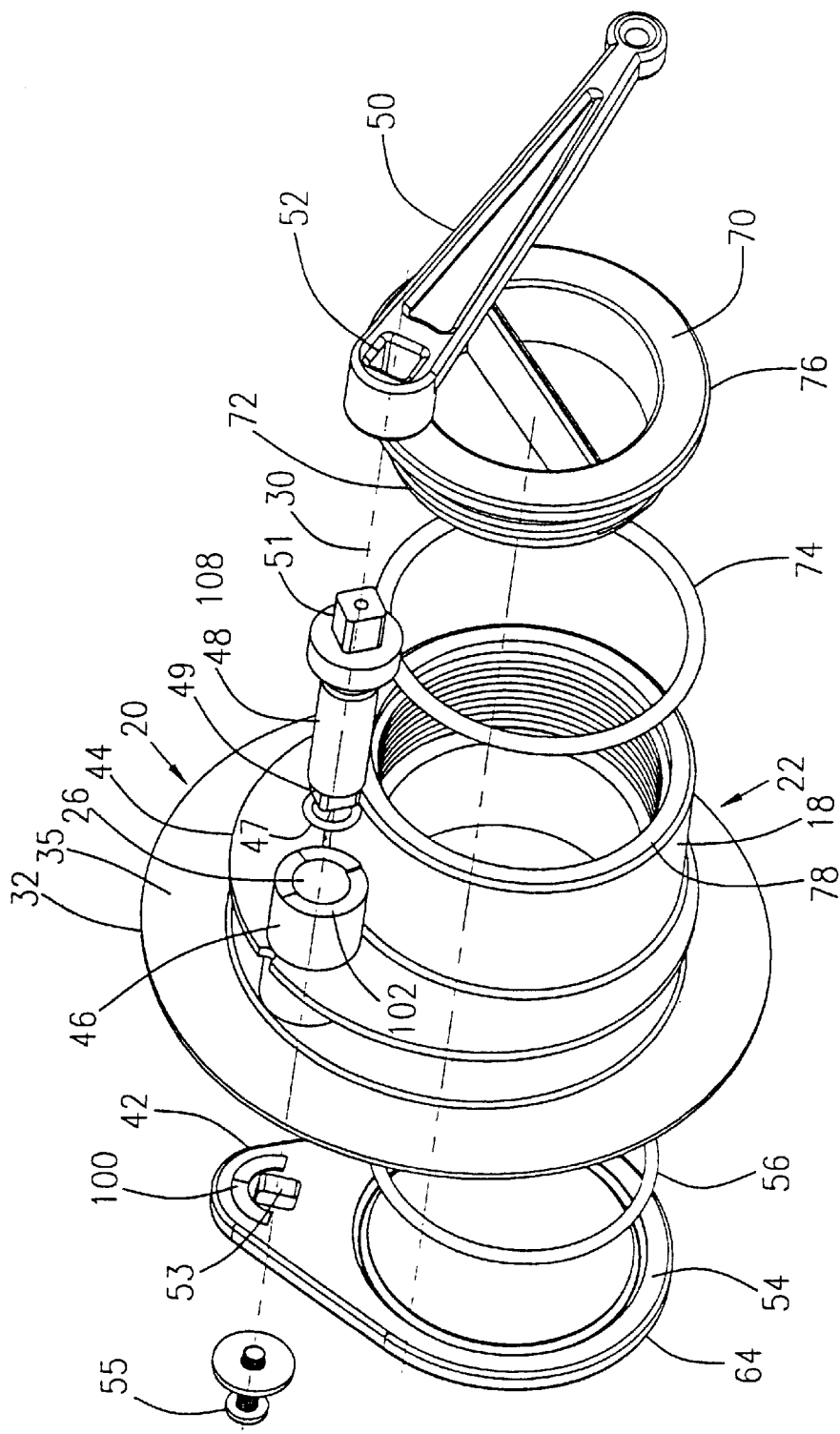
FIG. 3 is an isometric exploded view of the valve fitment and cooperating plug viewed from one axial end of the fitment.
Figure 4:
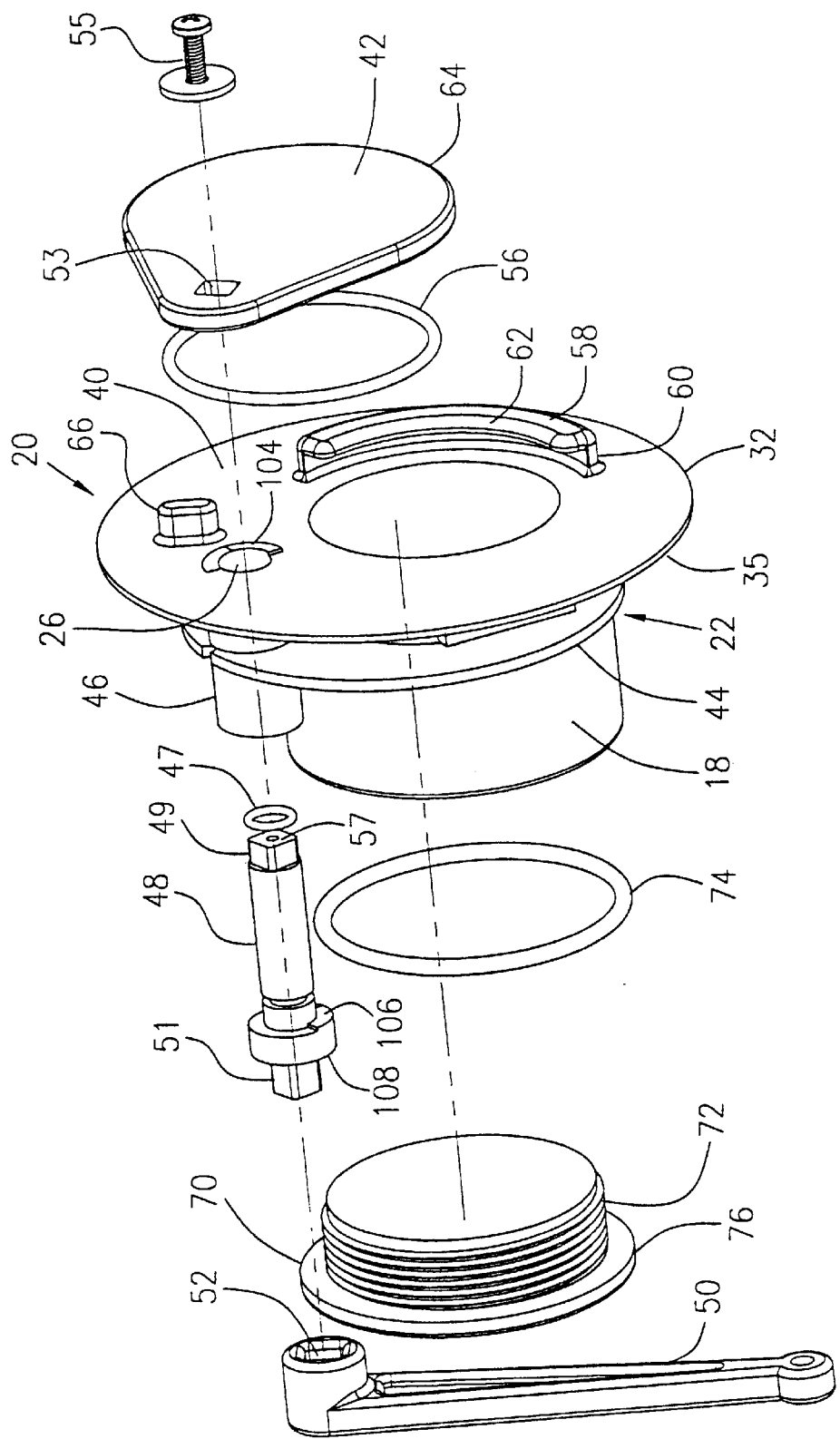
FIG. 4 is an isometric exploded view of the valve fitment and cooperating plug similar to FIG. 3 but viewed from an opposite end of the fitment.

The present invention relates to a valved fitment as illustrated in FIGS. 3 and 4 and a bag and box combination incorporating the valved fitment such as that illustrated in FIG. 1.

The bag and box combination is composed of a rigid outer container or box 10 in which is positioned a flexible bag 12 made of suitable flexible material. One particularly suitable container for forming rigid outer container is sold by MacMillan Bloedel Bulk Packaging under the trademark SpaceKraft™. These outer containers are composed of a plurality of layers of corrugated single face material wound into a tube of rectangular cross section, however the invention may also be used with other outer rigid containers.

The outer rigid container 10 is provided with a hole 14 through one of the walls (wall 16 in the illustrated arrangement) to define a passageway 14 through which a projecting portion 18 of fitment 20 projects.

Figure 2:
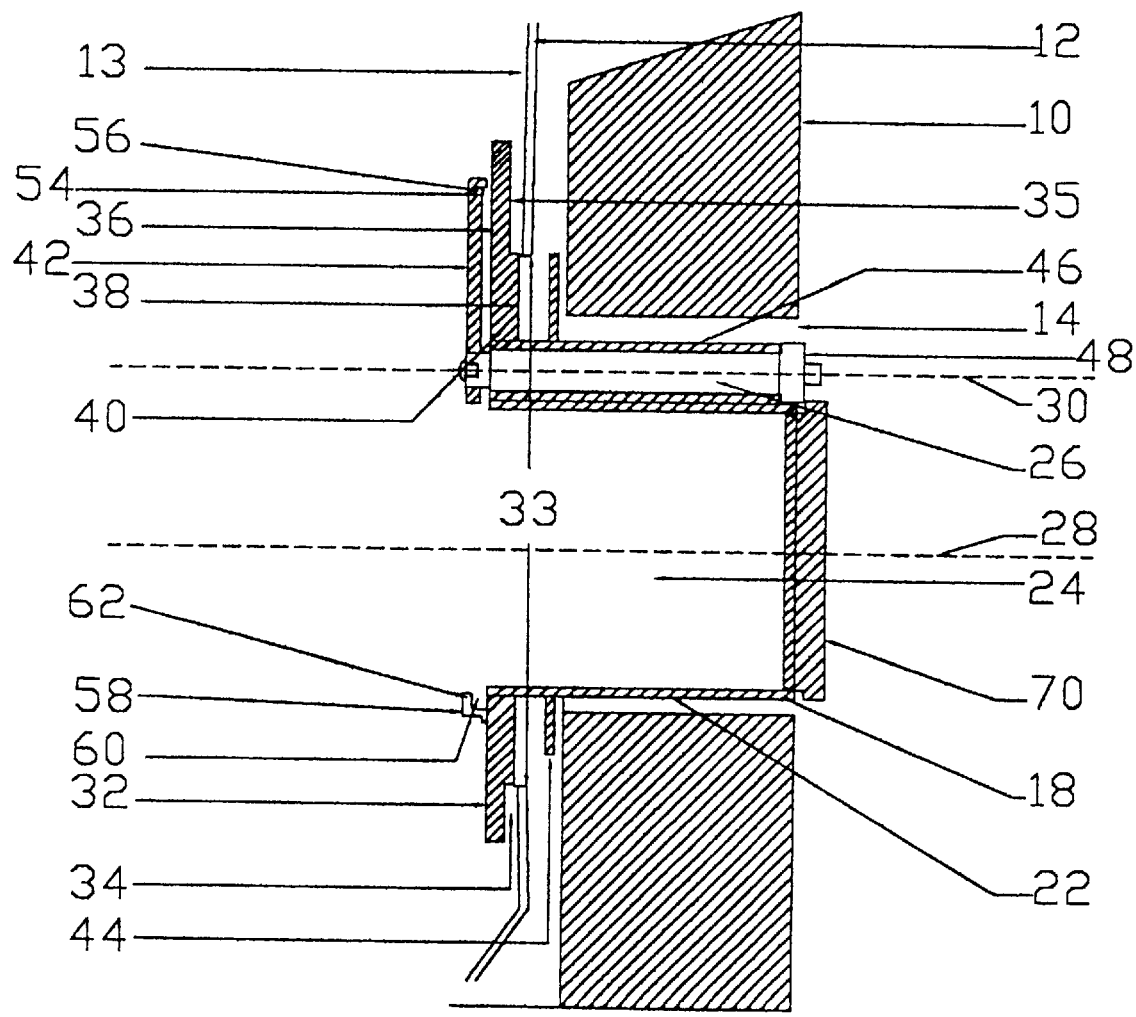
FIG. 2 is a section on the line 2—2 of FIG. 1.

As shown in FIG. 2 and in greater detail in FIGS. 3 and 4, the fitment 20 includes a body portion 22 that includes the projecting portion 18 and has an axial dispensing or flow passage 24 therethrough. The body portion 22 (as will be described below) is also provided with a shaft receiving passage 26. The dispensing or flow passage 24 and the shaft receiving passage 26 have their longitudinal axis 28 and 30 substantially parallel (see FIG. 3) at least at the inner end of the passage 24. It will be apparent that passage 24 occupies a substantial portion of the cross-sectional area of the body portion 22, which in turn occupies substantial portion of the area of the passageway 14 through the outer container 10.

A circumferential annular mounting flange 32 extends radially from the passage 24, (i.e. from the projecting portion 18 of the body portion 22) at the inner axial end of the body portion 22. This flange 32 is welded or otherwise secured to the bag 12 as indicated at 34 (FIG. 2) around the full periphery of the body portion 22, i.e. to completely surround and thus seal the passage 24. It will be noted that the projecting portion 18 of the fitment 20 extends through a hole 33 in the bag liner 12 (see FIG. 2) so that the flange 32 is positioned within the bag liner 12 i.e. the outside surface 35 of the flange 32 is in face to face relationship with and is secured in sealing relationship with the inner surface 13 of the bag liner 12 (see FIG. 2).

It is also possible to mount the fitment 20 outside of the bag 12 provided the operation of the valve to be described below is not obstructed.

It will be apparent from FIGS. 2, 3, and 4 that the flange 32 is divided into a thin outer section 36 and a thicker inner (smaller diameter) portion 38. The outer surface 35 of the thinner portion 36 in the illustrated arrangement is welded or otherwise secured to the inner surface 13 of the bag 12 to form a seal around the hole 33 in the bag 12 (see FIG. 2). The inner surface 40 of the thicker less flexible portion 38 of the flange 32 forms a cooperating surface 40 for cooperating with the valve plate 42 to seal the passage 24.

The body portion 22 is provided with a second radial flange 44 spaced axially from flange 32 on the side of the flange 32 remote from the surface 40. This flange 44 in combination with the flange 32 supports the cylindrical portion 46, which extends between and project outwardly from the flange 44. The passage 26 is formed through the cylindrical portion 46. A shaft 48 passes through the hole 26 and an O-ring 47 provides a seal around shaft 48. The axial ends of the shaft 48 are formed preferably with square or rectangular cross-sectional portions 49 and 51 to facilitate forming nonrelatively rotatable connection of inner end of shaft 48 to the valve plate 42 via portion 49 being snugly received in the correspondingly shaped hole 53 and the outer end of shaft 48 with a lever 50 via portion 51 being received in a socket 52 in the lever 50.

The valve plate 42 may be secured to the shaft in any suitable manner, in the illustrated arrangement it is secured to the shaft 48 via the bolt 55 threaded into an axial hole 57 in the shaft 48. It is intended that the lever 50 be removable from or applied to the square cross section portion 51 of the shaft 48 as required.

The valve plate 42 and flange 32 are adapted to form a seal closing the passage 24 when the valve plate 42 is in closed position. In the illustrated arrangement the valve plate 42 is provided with an annular groove 54 in which is received an O-ring seal 56 that cooperates with a cooperating face 40 of the flange 32 to seal the passage 24 when the valve plate 42 is moved from its open position clear of the passage 24 to a close position with the O-ring 56 encircling and forming a seal around the outer periphery of the passage 24.

Better control of the positioning of the valve plate 42 relative to the cooperating surface 40 of the flange 32 is provided by a substantially L-shaped guide forming element 58 which defines a guiding passage or groove 60 extending circumferencially of the passage 24 over a short portion of the circumference of the passage 24 on the side of the passage 24 opposite to the shaft 48. The guiding passage 60 is defined the between a flange 62 on the L-shaped element 58 and the cooperating face 40 on the flange 32. The valve plate 42 adjacent to its outer periphery 64 is received in the guide passage 60 when the valve plate 42 in closed position thereby helping to hold the valve plate 42 in closed position with the O-ring 56 in seal forming relationship with the surface 40 i.e. the spacing between the flange 62 and the surface 40 is coordinated with the thickness of the plate 42 plus the projecting thickness of the O-ring 56 to hold the O-ring 56 clamped against the surface 40. The length of the groove is coordinated with the movement of the valve plate 42 parallel to the longitudinal axis of the shaft 48 as will be described below to receive the peripheral portion of the valve plate 42 remote from the shaft 48 when the O-ring 56 has been moved into position against the surface 40. If desired the entrance end of the grove 60 receiving the peripheral portion of the valve plate 42 as it moves to closed position may be flared open to receive the portion before movement parallel to the axis of the shaft 48 is completed so the grove tends to force the valve plate 42 toward the surface 40 as movement of the valve plate 42 into closed position is being completed.

A suitable stop 66 projects from the face 40 adjacent to the passage 26 in position to engage a side edge periphery of the valve plate 42 when the valve plate 42 is turned to full open position and inhibit further movement in that direction.

After the bag liner 12 is in the outer container 10 and the bag 12 and box 10 is to be filled the valve plate 42 is closed and preferably, a suitable cap or plug such as that shown at 70 in FIGS. 2, 3 and 4 is screwed into the passage 24 via threads 72 on the cap 70 (and cooperating threads in the passage 24). Preferably an O-ring 74 is clamped between the flange 76 on the cap 70 and the front face or edge 78 on the body portion 22 surrounding the passage 24. The cap 70 thus provides a second seal for the fitment during shipment.

The fitment 20 is constructed with two pairs of pair cams each formed by a cam element and a cooperating cam element as will be described below that act together to move the valve plate 42 axially of the fitment 20 toward the surface 40 and seal the passage 24. This axial movement forces the O-ring seal 56 against the surface 40 and provides a seal around the passage 24 or separates the plate 42 from the surface 40 when the valve plate 42 is moved to open position. This is accomplished by the two pairs of cam elements cooperating to move the shaft 48 and thus the valve plate 42 axially relative to the longitudinal axis of the shaft 48, i.e. with the shaft 48 relative to the body portion 22 the fitment 20, as the shaft 48 is rotated to move the valve plate 42 between open and closed positions.

In the illustrated arrangement axial movement of the valve plate 42 relative to the body 22 of the fitment 20 is attained the combined action of two pairs of cams a first cam 90 and a second cam 92 each formed by a cam element and a cooperating cam element. A first cam element 100 forming the one of cam element of one of the pairs of cams is formed on the valve plate 42 partially encircling the hole 53 for the shaft 48 and facing outward toward the flange 32 and a second cam element 102 forming the one of cam element of the other of the pairs of cams also faces outward i.e. toward the end of the fitment 20 remote from the valve plate 42 and is positioned at the axial end of the cylindrical portion 46 and partially encircles the hole 26 through which the shaft 48 passes (i.e. the cam elements 100 and 102 are coaxial with the shaft 48).

A pair of inwardly facing cooperating cam elements 104 and 106 are form respectively on the surface 40 and on the larger diameter stop 108 which is an integral part of the shaft 48. The cooperating cam elements 104 and 106 each partially encircle the shaft 48 and are coaxial with the shaft 48 and when the fitment is fully assembled are positioned in cooperating relationship with the cam elements 100 and 102 respectively.

The cams 100 and 104 cooperate to form a first cam 90 and the cam elements 102 and 106 form a second cam 92.

Each cooperating pair of cam elements 100, 104 and 102, 106 is formed with a ramp segment as indicated at 110, 112, 114, and 116 respectively each sloping away from the major surface on which the cam elements is formed and connects to its high segment 118, 120, 122 and 124 respectively. The sloping segments slope at substantially the same angle to the respective surface of the fitment 20 to which they are attached at an angle $\alpha$. The high segments 120, 122 and 124 in the illustrated embodiment project in the outward direction relative to the portion of the fitment 10 to which it is attached by a distance X.

X will normally be in the range of 0.01 to 0.06 inches and $\alpha$ will normally be between about 0.65° and 4°.

Figure 5:
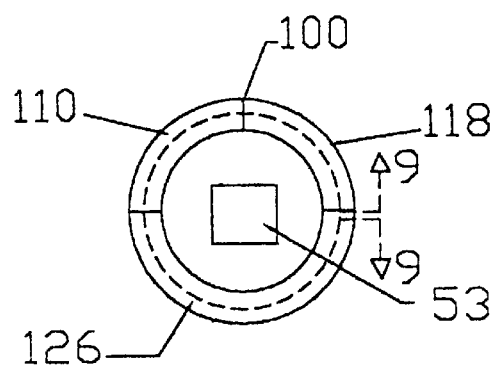
FIG. 5 is a view looking axially of the body of the valve in one direction showing a valve plate operating cam element.
Figure 6:
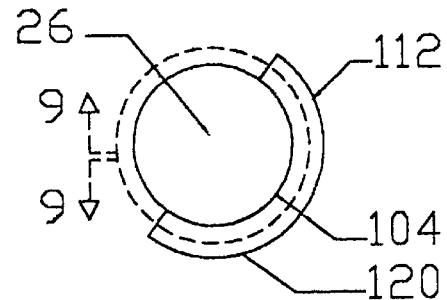
FIG. 6 is a view similar to FIG. 5 but looking in the opposite direction showing the cooperating cam element for the cam element of FIG. 5.
Figure 7:
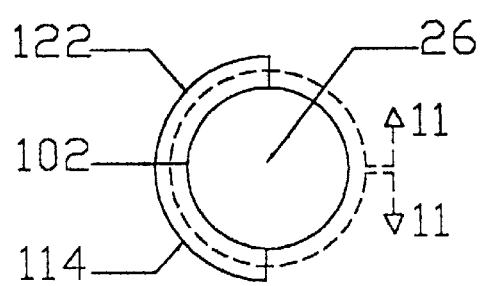
FIGS. 7 and 8 are views similar FIGS. 5 and 6 showing a second pair of cooperating cam elements that combine with the first pair to positively axially move the valve plate.
Figure 8:
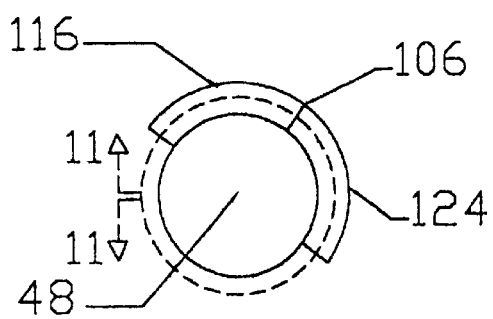

When an O-ring such as the O-ring 56 is used to seal the passage 24, the cam element 100 is specially constructed so that pressure is applied to the O-ring 56 when the valve plate 42 is in closed position. The cam element 100 as above described has a high section 118 and to its left as shown in FIG. 5 has a ramp segment 110, however the ramp segment instead of terminating at the surface of the valve plate 42 connects to the bottom of a circular channel 126 extending from the ramp 110 to the right side or end of the high section 118. This groove or channel 126 has a depth Y (see FIG. 10) and the high section 118 in the preferred embodiment projects from the bottom of the groove 126 a distance X. This construction means that the separation between the face 130 of the valve plate 42 (see FIGS. 3, 9 and 10) is 2X–Y when the valve plate 42 is in open position and X–Y=Z inches when the valve plate 42 is in closed position. Z will be slightly less that the amount the O-ring 56 projects from the face 130 so that in closed position the O-ring 56 is compressed to the degree required to form a seal.

In a specific example X was 0.03 inches Y was 0.02 inches so Z was 0.01 inches to apply pressure on the O-ring 56 and α was 1.95°.

The dual acting cams as illustrated and as above described are preferred, however other dual acting cams such as cooperating threads on the shaft 48 and the passage 26 or a pin in grove combination, or the like that displace the valve plate 42 in a first direction parallel to the longitudinal axis of the shaft 48 as the shaft 48 and plate 42 are rotated to closed position and in the opposite direction when the shaft 48 and plate 42 are rotated in the opposite direction to the open position could be used.

In operation when the valve plate 42 is in closed position (FIGS. 9 and 11) the high segments 118 and 120 on the cam elements 100 and 104 are miss-aligned with the high segment 120 received in the groove 126 while the high segments 122 and 124 on the cooperating cams 102 and 106 are in mating relationship to move the shaft 48 and thus the valve plate 42 axially on the axis of the shaft 48 toward the surface 40 and clamp the O-ring 56 against the surface 40. After the valve plate 42 has been moved toward the surface 40 the peripheral portion 64 of the valve plate 42 remote from the shaft 48 is received in the groove 60 as movement of the valve plate to closed position is completed so that the free end of the valve plate 42 is trapped in position holding the O-ring 56 against the surface 40. If desired as above indicated if the inlet end of the groove 60 is flared it may be extended to receive the peripheral portion 64 before movement of the valve plate 42 toward the surface 40 is completed so the groove 60 acts as a cam forcing the free end of the plate 42 toward the surface 40.

On the other hand when the shaft 48 is rotated to move the valve plate 42 to open position the high segment 118 and 120 on the cam elements 100 and 104 are aligned while the high segments 122 and 124 of cam elements 102 and 106 are miss-aligned to move the valve plate 42 away from the surface 40.

It is believed the operation of the present invention is apparent. The fitment 20 is secured to the bag liner 12 and the bag is then positioned within the box or outer container 10 with the fitment 20 extending through the passage 14 in the box 10. The fitment 20, as is apparent, preferably does not project beyond the outside of the box 10 (in some cases, it may project beyond the box). Plug or cap 70 is screwed into the passage 24 to seal the passage and the valve plate 42 is moved to close position closing the inner end of the passage 24 SO that there are now two seals one at each end of the passage 24, one formed by the plate 42 and the other by the plug 70. With the fitment 20 sealed and the bag 12 positioned in the box 10 the bag 12 is then filled with material, e.g. liquid or fluid that will flow through the passage 24. The bag 12 and box 10 are then closed and the package is shipped to the consumer.

At the consumer's, the plug 70 is removed (the passage 24 remaining closed via the valve plate 42 being in closing position) and the fitment 20 is connected via hoses or the like to the desired location.

To operate this system, it is necessary to apply the lever 50 to the end 51 of the shaft 48 and rotate the shaft 48 which via the pairs of cams 90 and 92 moves the shaft 48 axially and the valve plate 42 into the open position with the valve plate 42 spaced from the surface 40 and offset relative to the passage 24 to permit flow through the passage 24. When desired to shut off the flow, it is merely necessary to again rotate the shaft 48 and thus the plate 42 back to closed position to again via the pairs of cams 90 and 92 causes the shaft 48 to move axially in the opposite direction and the plate 42 to move toward the surface 40 and into overlying relation to the passage 24 to seal the passage 24.

Having described the invention, modifications will be evident to those skilled in the art without departing from the scope of the invention as defined in the appended claims.

We claim:

1. A valved fitment comprising a body portion having an axial passage formed therethrough, an annular radial flange on said body portion surrounding an inner end of said passage, a valve plate, a shaft pivotably mounting said valve plate on said body portion for movement with said shaft about a longitudinal axis of said shaft, said longitudinal axis of said shaft being parallel to a longitudinal axis of said axial passage at said inner end of said axial passage and being spaced to one side of said axial passage, said valve plate sealing said axial passage when said valve plate is turned by said shaft into a closed position and to open said passage when said shaft is turned on its said longitudinal axis to an open position, a dual acting cam for moving said valve plate parallel to said longitudinal axis of said shaft, said dual acting cam including a first cam means connected to said valve plate and a cooperating cam means fixed to said body portion, said first cam means and said cooperating cam means acting to move said valve plate toward said surface when said valve means is turned by said shaft toward said closed position and to move said valve plate away from said surface when said valve plate is moved toward said open position.

2. A valved fitment as defined in claim 1 wherein said first cam means comprises a first pair of cam elements coaxial with said shaft means, one cam element of said first pair of cam elements positioned adjacent to an inner end of said shaft and adjacent to one axial end of said body portion and a second cam element of said first pair of cam elements axially spaced from said inner end of said shaft and on side of said body portion opposite said surface and said cooperating cam means comprises a pair of cooperating cam elements each positioned to cooperate with its adjacent of said first pair of cam elements to positively move said valve plate axially relative to said longitudinal axis of said shaft.

3. A valved fitment as defined in claim 2 wherein each cam element of said first pair of cam elements and each cooperating cam element of said pair of cooperating cam elements includes a raised cam portion and a sloping cam portion leading to said raised cam portion, said raised portions on said one cam element and its cooperating cam element being in opposing relationship when said valve plate is in open position and said raised portions on a second cam element and its cooperating cam element being in offset relationship when said valve plate is in said open position.

4. A valved fitment as defined in claim 1 wherein said sealing means comprises an O-ring gasket having a diameter larger than the diameter of said axial passage and that surrounds said axial passage when said valve plate is in said closed position.

5. A valved fitment as defined in claim 2 wherein said sealing means comprises an O-ring gasket having a diameter larger than the diameter of said axial passage and that surrounds said axial passage when said valve plate is in said closed position.

6. A valved fitment as defined in claim 3 wherein said sealing means comprises an O-ring gasket having a diameter larger than the diameter of said axial passage and that surrounds said axial passage when said valve plate is in said closed position.

* * * * *